United States Patent [19]

Yang

[11] Patent Number: 5,412,298

[45] Date of Patent: May 2, 1995

[54] MOTOR CONTROL CIRCUIT HAVING SERIES OR COMPOUND EXCITATION DURING STARTING AND SHUNT EXCITATION DURING NORMAL RUNNING

[76] Inventor: Tai-Her Yang, 5-1 Taipin St., Si-Hu Town, Dzan-Hwa, Taiwan, Prov. of China

[21] Appl. No.: 104,638

[22] Filed: Aug. 11, 1993

[51] Int. Cl.⁶ .............................................. H02P 1/18
[52] U.S. Cl. .................................. 318/529; 318/521; 318/252; 318/297
[58] Field of Search ............... 318/244, 245, 246, 251, 318/252, 247, 248, 296, 297, 298, 299, 431, 432, 493, 521, 523, 526, 527, 529, 531, 536; 388/826

[56] References Cited

U.S. PATENT DOCUMENTS 3,569,809  3/1971  Comer .
3,670,225  6/1972  Kitaoka et al. .
3,845,368  10/1974  Elco .
5,310,016  5/1994  Rudelle .

*Primary Examiner*—Bentsu Ro
*Attorney, Agent, or Firm*—Bacon & Thomas

[57] ABSTRACT

A motor control circuit provides series or compound excitation during starting and shunt excitation during normal running. A switch responsive to the motor speed, the armature current, the armature EMF, or the like, includes terminals connected to the series winding and a series winding bypass to permit switching between a compound series and a shunt configuration. In addition, a tap may be provided on the series winding for providing intermediate characteristics, and separate switches for the series and shunt field windings may also be provided.

13 Claims, 2 Drawing Sheets

MOTOR CONTROL CIRCUIT HAVING SERIES OR COMPOUND EXCITATION DURING STARTING AND SHUNT EXCITATION DURING NORMAL RUNNING

SUMMARY OF THE INVENTION

The present motor control circuit provides series or compound excitation during starting and shunt excitation during normal running. Shunt operation provides high efficiency and low loss under normal operation while series or compound excitation provides excellent starting or overload operation.

DETAILED DESCRIPTION OF THE PREFERRED EMBODIMENTS

The conventional series or compound motor often has excellent starting and overload characteristics, i.e., a good movement to current ratio, but its normal operation efficiency is inferior due to the drop in the series field at normal operating speeds. In contrast, a shunt motor has good efficiency under normal operation but the current is too large during starting and overload. The present motor control circuit provides shunt operation for high efficiency and low loss under normal operation, and applies series or compound excitation for starting or overload operation.

Figure 1:
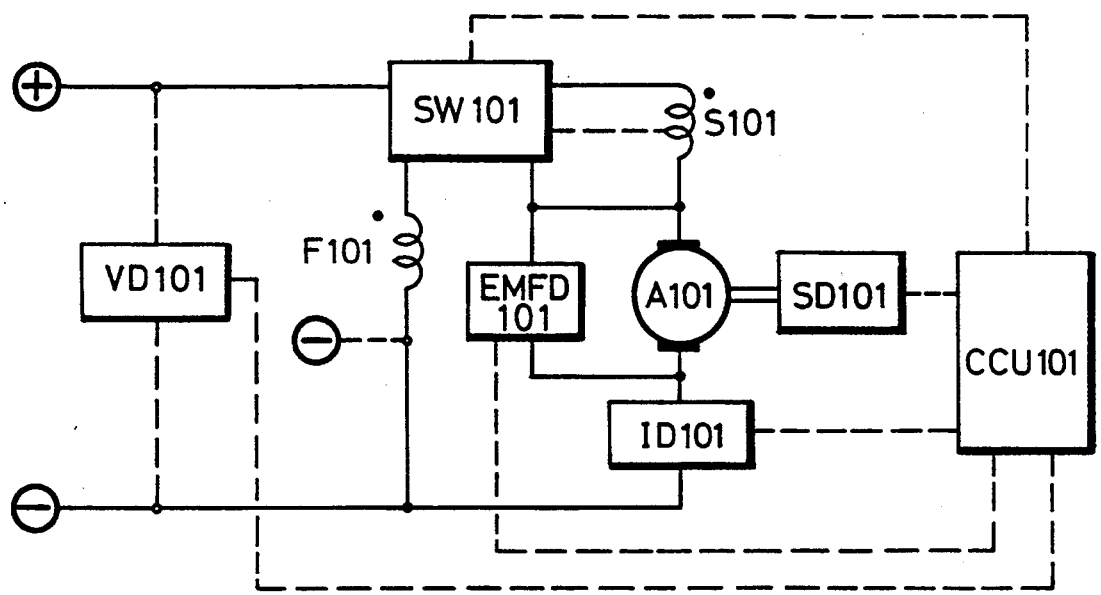
FIG. 1 is a diagram showing the structure of a preferred motor control circuit which provides series or compound excitation during starting and shunt excitation during normal running.

FIG. 1 is a functional block diagram showing the overall structure of the preferred motor control circuit for series or compound starting and shunt normal running, including a series motor in which the series field winding S101 has an intermediate tap connected in series between armature A101 and switch device SW101, and a shunt winding F101 having a common power supply with the series winding (or optionally an independent power supply) to enable the motor to resemble a compound type motor by controlling switch device SW101. Switch device SW101 may include a relay operated by motor centrifugal force or driven by current, or optionally an electromechanical or solid state switch device controlled by a central control unit CCU101, the switch device SW101 being provided to enable the motor to appear as a series or compound type motor during starting while enabling the motor to be in a shunt wiring state under normal operation, or to switch to the intermediate tap of the series field winding in order to obtain intermediate characteristics.

The preferred circuit may also include a motor speed detector SD101, an armature current detector ID101, or an armature electric motive force detector EMFD101 for analog or digital detection of motor speed, current, or armature electric motive force and sending to the optimal controller CCU101, if available, in order to control the switch device for series or compound during starting and parallel connection during normal operation.

Optional controller CCU101 can be provided to define current, speed value, or armature EMF value for switching the motor from series or compound operation for starting or an overload state to shunt operation for normal operation.

The preferred system including a single rated armature voltage state may further be applied to a compound voltage driven armature system and, particularly if the armature or shunt field power supply voltage is a variable compound voltage, the driving voltage and the speed, armature current value of EMF value can be transmitted to controller CCU101 by means of a voltage detector VD101 connected in parallel with the power supply in order to modify various reference values for switching in accordance with a change in power voltage input.

Figure 2:
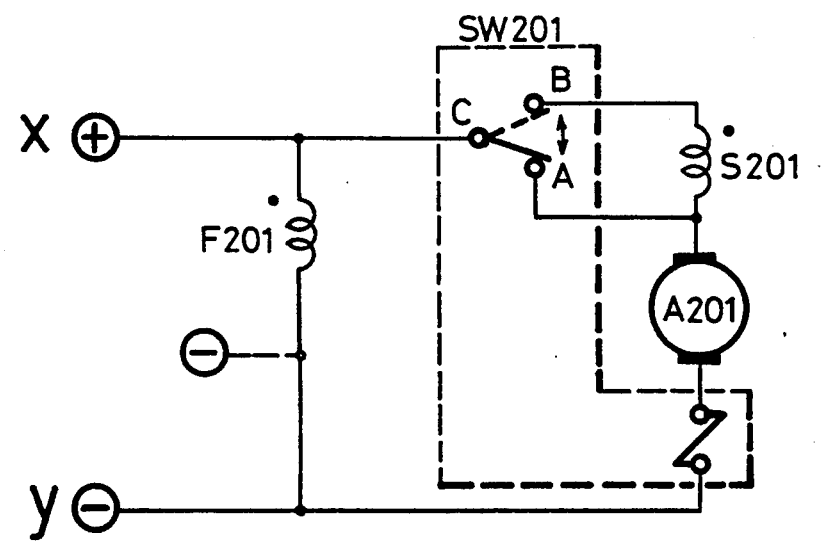
FIG. 2 shows an embodiment of the preferred motor control circuit in which series or compound excitation during starting and shunt excitation during normal running is provided by a C contact point switch.

FIG. 2 shows a preferred embodiment in which a motor control circuit for series or compound starting and shunt normal running includes a C contact point switch. The circuit of this embodiment includes a series field winding S201, connected in series with armature A201, one end of the armature leading to the power supply terminal Y while the series field winding S201 and connection end of armature A201 are connected to the contact point A of the C contact point switch, and the contact point A and contact point C both appear closed under normal operation. The other end of series field winding S201 leads to the contact point B of the C contact point switch, with the joint contact point C of the C contact point switch SW201 being connected to the power supply X. The C contact point switch is an active current type relay connected in series with and actuated by the current in the armature, driven by centrifugal force, or driven by an armature EMF drive type relay. Contact points C and B are connected during start or overload, while contact points C and A are connected during normal operation.

In this embodiment, shunt field winding F201 is parallel connected between the power supply terminals X and Y (or optionally, between terminals of an independent power supply) and the motor will appear to be shunt wound during normal operation by virtue of the changeover of the C contact point switch after starting, while appearing to be compound wound during starting and overload.

Figure 3:
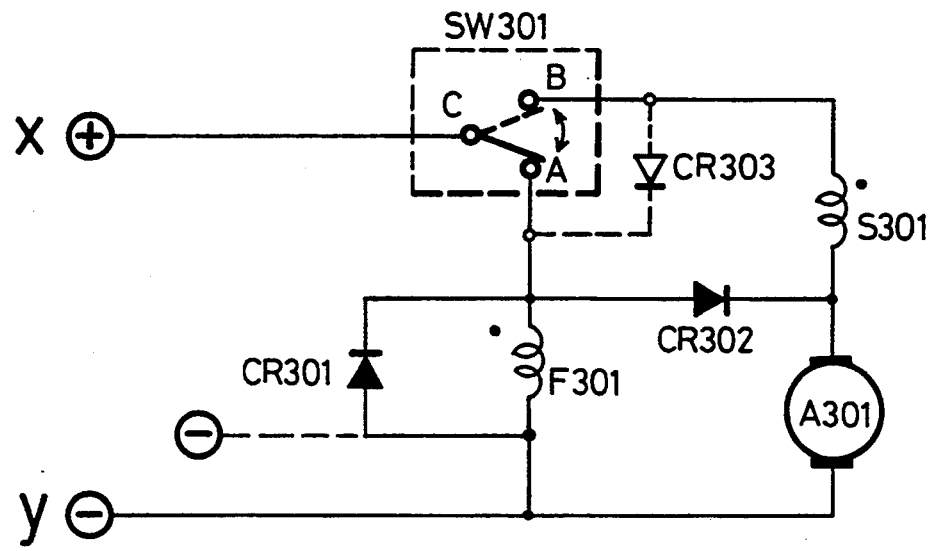
FIG. 3 shows another embodiment of the preferred motor control circuit in which series or compound excitation during starting and shunt excitation during normal running is provided by a C contact point switch.

FIG. 3 shows another preferred embodiment in which the preferred motor control circuit includes a C contact point switch and a series field winding S301 connected in series with armature A301, the end of armature A301 leading to the power supply terminal Y while a diode CR302 is connected between the contact point of the series field winding S301 and armature A301 and the normally open contact point A of the C contact point switch SW301 so that current flows from contact point A to the armature A301 during normal operation. The other end of series field winding S301 leads to the normally closed contact point B of the C contact point switch, with the joint contact point C of the C contact point switch SW301 leading to the power supply X. In this embodiment, the C contact point switch can also be driven by centrifugal force or by a current responsive relay connected in series with the armature, or be driven by an armature EMF driven relay, such that contact points C and B are connected during start or overload, while contact points C and A are connected during normal operation.

The shunt field winding F301 is parallel connected between the normally open contact point A of the C contact point switch and ground wire Y (or to an independent power supply controlled by the contact point A), and to a flywheel diode CR301. The motor of this embodiment again appears to be shunt connected during normal operation by virtue of the changeover of the C contact point switch after starting, and appears to be series connected during starting and overload. Furthermore, a diode CR303 can be positively series connected between the contact point A of the C contact point switch and the contact point B, so that the motor will appear to have compound wiring during starting or overload.

Figure 4:
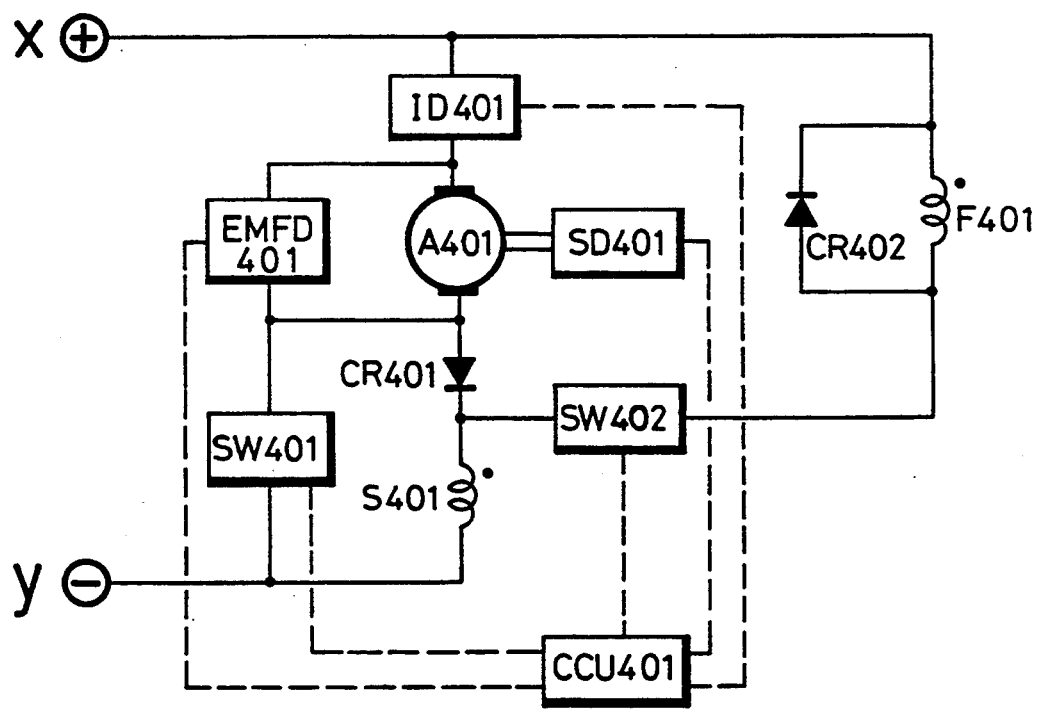
FIG. 4 shows an embodiment of the preferred motor control circuit in which series or compound excitation during starting and shunt excitation during normal running is provided by an auxiliary field winding.

FIG. 4 is a functional block diagram of an embodiment which includes an auxiliary field winding F401, and in which an armature A401, current detector ID401, and diode CR401 are connected in series, and then series connected with the series field winding S401, and finally parallel connected to the power supply, the diode CR401 being connected between the armature A401 and the series field winding S401.

In this embodiment, the switch SW401 is connected in parallel between the output end of the series field winding S401 and the contact point of armature A401 and diode CR401, a second switch SW402 synchronously driven with SW401 being parallel connected to the contact point of diode CR401 and series field winding S401. The positive and negative ends of shunt field F401 have the same polarity as those of the series field winding, with one terminal of detector ID401 leading to the positive terminal X of the power supply, and the flywheel diode CR402 being parallel connected to both ends of shunt field winding F401.

Controller CCU401 can accept an input signal from the motor armature current detector ID401, from a motor speed detector SD401, or from armature electric motive force detector EMFD401 and compare the signal with a preset value in order to turn ON the switches SW401 and SW402 to enable the motor to appear to be parallel connected during normal operation, and turn the switches OFF to cause the motor to appear to be series connected start or overload operation.

In the case where two switches SW401 and SW402 are used, the illustrated contact points A, B, and C of the C contact point switch may be replaced by respective contacts for each switch and each detector may be connected accordingly. The spirit of the present invention lies in: (1) normal shunt running (2) changeover to series or compound wiring during starting and overload (3) initiation of the changeover by centrifugal force, a current drive relay, or by a central control unit with reference to a comparison among the armature voltage, motor speed, and a set changeover point.

I claim:

1. A motor control circuit, comprising:
a series motor which includes a series field winding, a shunt field winding, and means including a switch device for connecting the series winding in series between a power supply and an armature of the motor for providing series operation during start up or overload, and for bypassing the series winding during normal operation to provide a shunt connection during normal operation.

2. A motor control circuit as claimed in claim 1, further comprising an intermediate tap connected in series between the series field winding and the switch device for providing motor operating characteristics intermediate those obtained during said series or normal operation.

3. A motor control circuit as claimed in claim 1, wherein said switch device is a relay operated by motor centrifugal force.

4. A motor control circuit as claimed in claim 1, wherein said switch device is a relay operated by current in the motor armature.

5. A motor control circuit as claimed in claim 1, further comprising a central control unit, said central control unit including means for generating a control signal in response to the detection that the motor has reached a predetermined operating condition.

6. A motor control circuit as claimed in claim 1, wherein said switch device is a solid state switch device controlled by a central control unit which outputs a control signal to said solid state switch device upon detection that the motor has reached a predetermined operating state.

7. A motor control circuit as claimed in claim 1, wherein said switch device is responsive to a central control unit having as an input a signal from a motor speed detector.

8. A motor control circuit as claimed in claim 1, wherein said switch device is responsive to a central control unit having as an input a signal from an armature current detector.

9. A motor control circuit as claimed in claim 1, wherein said switch device is responsive to a central control unit having as an input a signal from an armature electromotive force detector.

10. A motor control circuit as claimed in claim 1, wherein said switch device is responsive to a central control unit having means for inputting a signal from a voltage detector connected in parallel to a power supply for changing a set point of the switch device.

11. A motor control circuit as claimed in claim 1, wherein the switch device includes a first contact point connected between the armature and the series field winding and a second contact point connected between a terminal of the power supply and the shunt field winding, the contact points being normally connected to bypass the series field winding, and wherein the switch device further includes a third contact point connected to an opposite side of the series field winding such that when the second contact point is connected to the third contact point, the series field winding is in series with the power supply terminal to provide series excitation.

12. A motor control circuit as claimed in claim 1, wherein the switch device includes a first contact point connected to a terminal of the power supply, a second contact point connected to one of two ends of the shunt field winding, and a third contact point connected to one end of the series field winding, wherein the first contact point is connected to the second contact point during normal operation and to the third contact point during start-up or overload, wherein a flywheel diode is connected between the ends of the shunt field winding and a second diode is connected between the first contact point and the second contact point so that the shunt and series field windings are both connected to the terminal of the power supply during start-up and overload, and whereby the motor operates as a compound motor during start-up or overload and as a shunt motor in which the series winding is by-passed during normal operation.

13. A motor control circuit as claimed in claim 1, wherein the switch device includes a first switch device connected in parallel with the series field winding and a second switch device connected between the series field winding and the shunt field winding.

* * * * *